(12) United States Patent
Itokazu

(10) Patent No.: US 12,257,709 B2
(45) Date of Patent: Mar. 25, 2025

(54) LINEAR MOTION MECHANISM AND HORIZONTAL ARTICULATED ROBOT

(71) Applicant: FANUC CORPORATION, Yamanashi (JP)

(72) Inventor: Kenta Itokazu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/546,557

(22) PCT Filed: Mar. 17, 2022

(86) PCT No.: PCT/JP2022/012309
§ 371 (c)(1),
(2) Date: Aug. 15, 2023

(87) PCT Pub. No.: WO2022/202614
PCT Pub. Date: Sep. 29, 2022

(65) Prior Publication Data
US 2024/0123608 A1 Apr. 18, 2024

(30) Foreign Application Priority Data
Mar. 22, 2021 (JP) .................................. 2021-047067

(51) Int. Cl.
*B25J 9/04* (2006.01)
*B25J 19/00* (2006.01)

(52) U.S. Cl.
CPC ........... *B25J 9/044* (2013.01); *B25J 19/0075* (2013.01); *B25J 19/0083* (2013.01)

(58) Field of Classification Search
CPC ..... B25J 9/044; B25J 19/0075; B25J 19/0083
See application file for complete search history.

(56) References Cited

U.S. PATENT DOCUMENTS

2024/0044398 A1* 2/2024 Kuroki ..................... B25J 9/044

FOREIGN PATENT DOCUMENTS

| JP | 2010110830 A | 5/2010 |
|----|--------------|--------|
| JP | 2011101907 A | 5/2011 |
| JP | 2012228733 A | 11/2012 |

OTHER PUBLICATIONS

International Search Report and Written Opinion for priority International Application No. PCT/JP2022/012309, mailed May 31, 2022 (translation of Search Report only).

* cited by examiner

*Primary Examiner* — Terence Boes
(74) *Attorney, Agent, or Firm* — Renner, Otto, Boisselle & Sklar, LLP

(57) ABSTRACT

A linear motion mechanism is provided with a shaft extending along an axis, a drive mechanism which moves the shaft in the axis direction, a housing which accommodates the drive mechanism and which has an opening allowing one end portion of the shaft to project to the outside so as to be capable of moving backward and forward, and a tubular protective cover of which the two ends are fixed to the housing and the end portion of the shaft. The protective cover encloses the opening and the part of the shaft that projects outward from the opening, expands and contracts in the axis direction with movement of the shaft relative to the housing in the axis direction, and is fixed to the housing in a position in which a part of the drive mechanism including an end surface through which the shaft projects is disposed inside the protective cover.

5 Claims, 5 Drawing Sheets

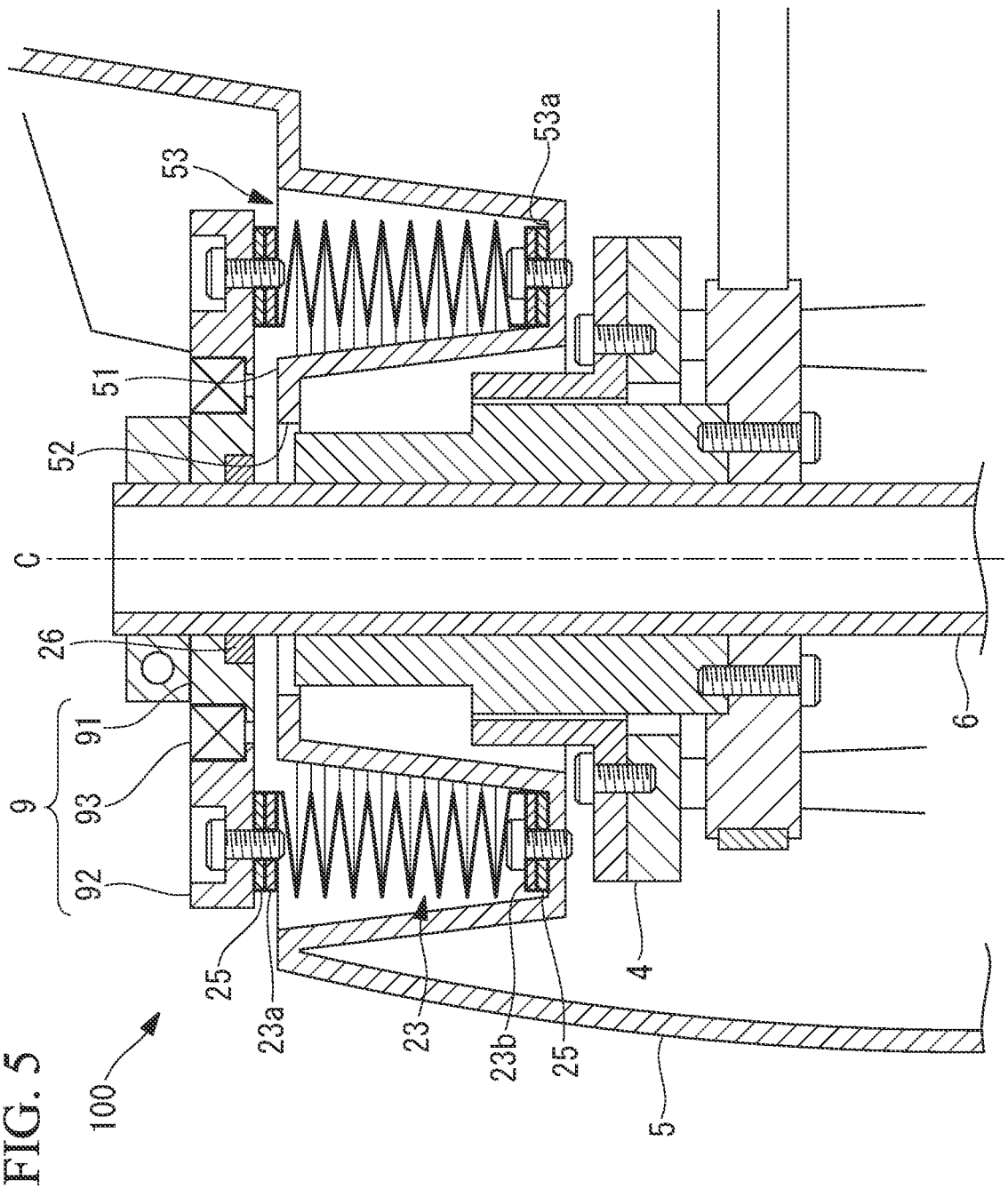

LINEAR MOTION MECHANISM AND HORIZONTAL ARTICULATED ROBOT

This application is a national phase of International Patent Application No. PCT/JP2022/012309, filed Mar. 17, 2022, which claims priority to Japanese Patent Application No. 2021-047067, filed Mar. 22, 2021, each of which is hereby incorporated herein by reference in its entirety.

TECHNICAL FIELD

The present disclosure relates to a linear motion mechanism and a horizontal articulated robot.

BACKGROUND ART

There is a known SCARA type robot including: in an upper portion of a horizontally rotatable second arm, a cover that covers a mechanism portion; and an operating shaft that penetrates the second arm and the cover so as to be movable in a direction along a vertical axis, and that is also supported so as to be rotatable about the vertical axis (for example, see Patent Literature 1). A gap between the operating shaft and an upper insertion hole through which the operating shaft penetrates the cover is covered by an upper bellows-like member disposed between an upper end of the operating shaft and an upper surface of the cover. In addition, a gap between the operating shaft and a lower end opening through which the operating shaft penetrates the second arm is covered by a lower bellows-like member disposed between a lower end of the operating shaft and a lower surface of the second arm.

In the operating shaft, both ends of a spline shaft, which has a length required to rotate the operating shaft about the vertical axis over a required stroke range, are extended by means of relay shafts for attachment of the bellows-like members.

CITATION LIST

Patent Literature

{PTL 1} Japanese Unexamined Patent Application, Publication No. 2012-228733

SUMMARY OF INVENTION

The relay shafts increase the weight of the operating shaft and also increase the length of the operating shaft in the vertical axis direction, thus increasing the size of the linear motion mechanism of the SCARA type robot. Therefore, it is desirable to arrange a protective cover, such as a bellows-like member, without increasing the size of the linear motion mechanism while ensuring a sufficient stroke of the operating shaft.

An aspect of the present disclosure is directed to a linear motion mechanism including: an elongated shaft that extends along a prescribed axis; a drive mechanism that moves the shaft in the axis direction with a prescribed stroke; a housing that accommodates the drive mechanism and that is provided with an opening through which at least one end portion of the shaft protrudes to the outside in a retractable manner; and a tubular protective cover having two ends fixed to the housing and the end portion of the shaft, wherein the protective cover surrounds the opening and a portion of the shaft protruding outward from the opening, extends and contracts in the axis direction in accordance with movement of the shaft in the axis direction with respect to the housing, and is fixed to the housing at a position where a portion of the drive mechanism, including an end surface through which the shaft protrudes, is disposed inside the protective cover.

BRIEF DESCRIPTION OF DRAWINGS

FIG. 5 is a partial longitudinal sectional view showing a modification of the linear motion mechanism in FIG. 3.

DESCRIPTION OF EMBODIMENT

A linear motion mechanism 100 and a horizontal articulated robot 1 according to an embodiment of the present disclosure will be described below with reference to the drawings.

Figure 1:
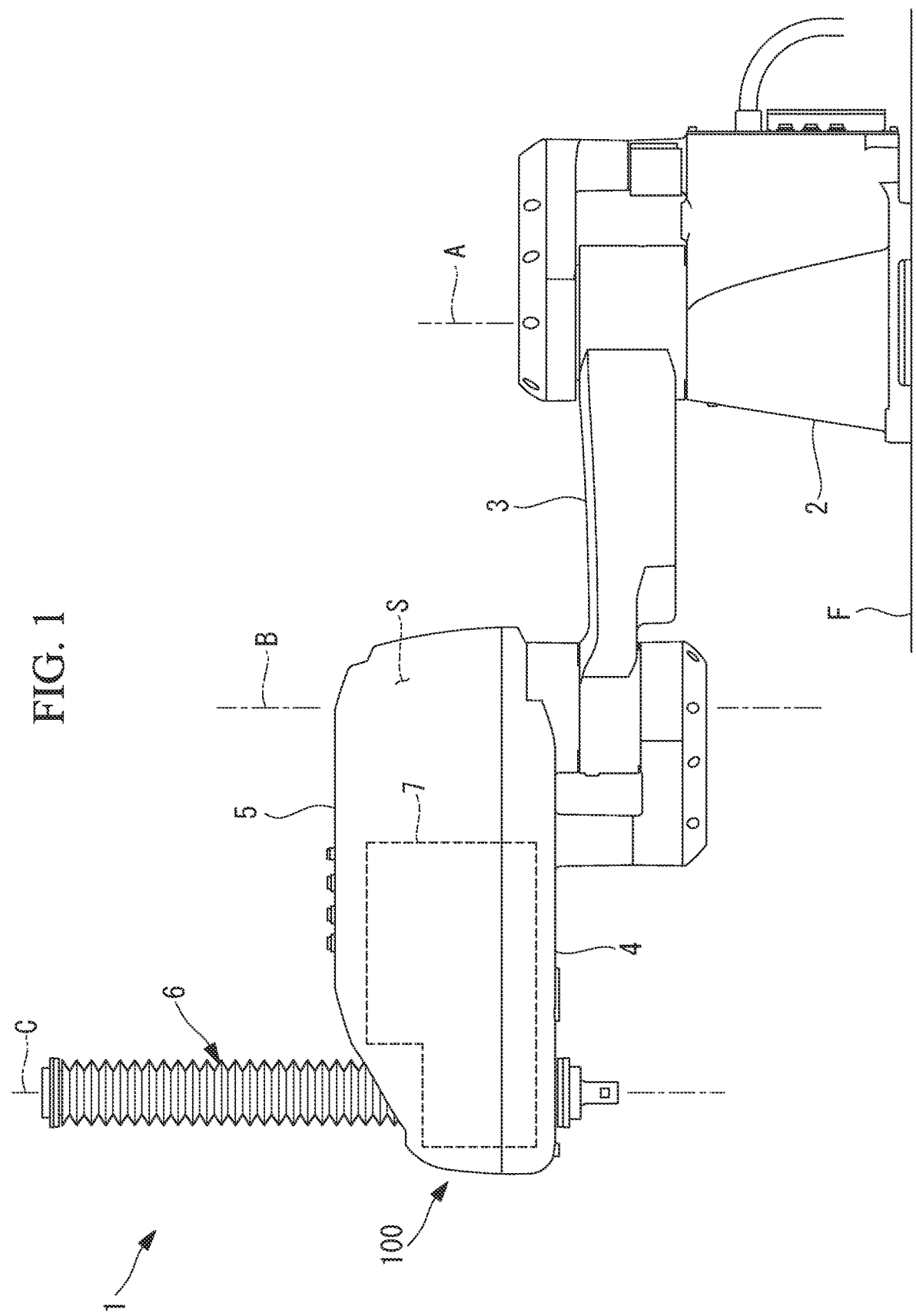
FIG. 1 is an overall configuration diagram showing a horizontal articulated robot according to an embodiment of the present disclosure.

As shown in FIG. 1, the horizontal articulated robot 1 according to this embodiment includes, for example: a base 2 that is installed on a horizontal floor F; a first arm 3 that is supported on the base 2; and a second arm (housing, arm) 4 that is supported on the first arm 3.

The first arm 3 is supported on the base 2 so as to be rotatable about a first axis A extending in the vertical direction.

The second arm 4 is supported on the first arm 3 so as to be rotatable about a second axis B parallel to the first axis A. An arm cover (housing) 5 for covering an upper portion of the second arm 4 is attached to the second arm 4, and a space S is defined between the arm cover 5 and the second arm 4.

Figure 2:
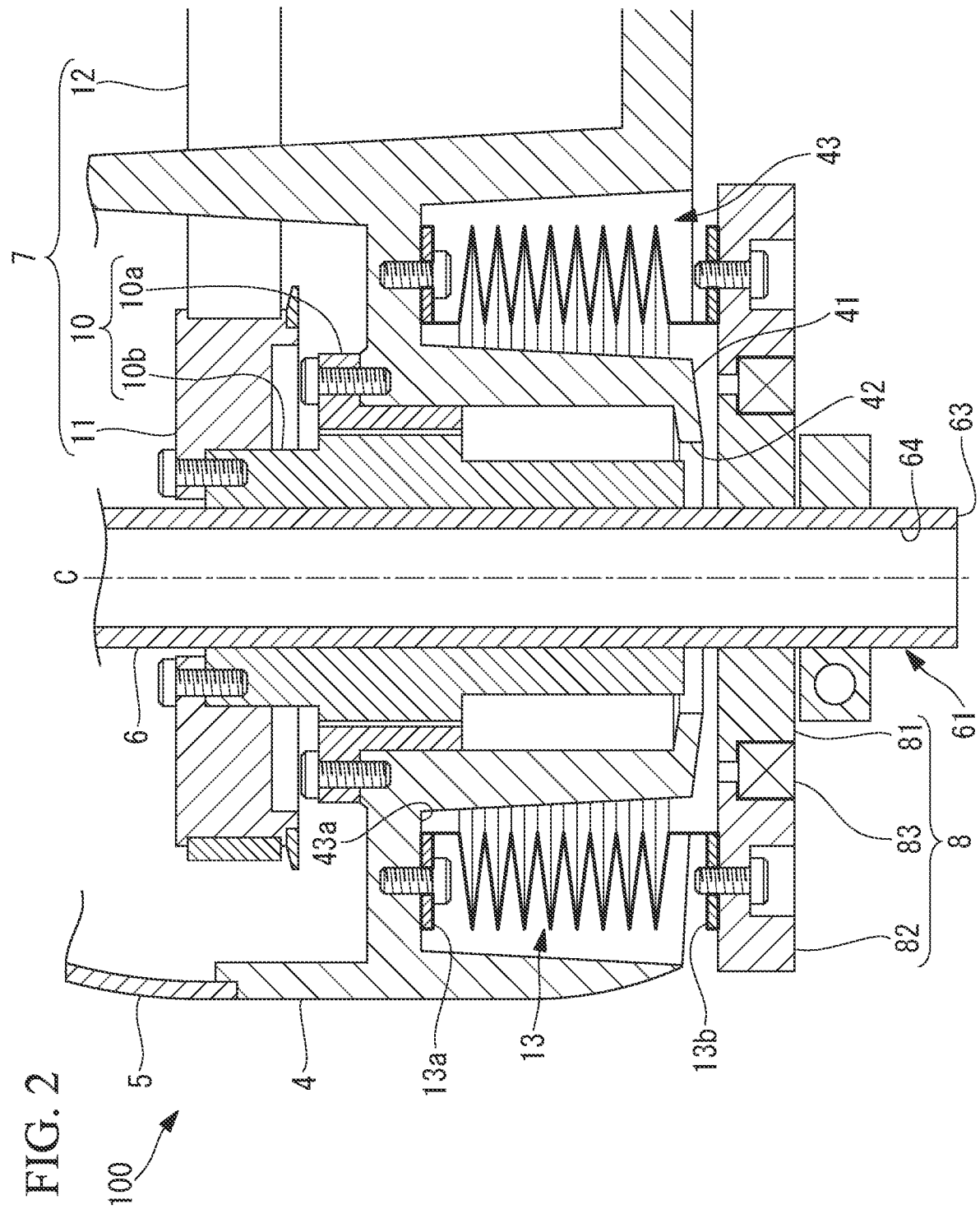
FIG. 2 is a partial longitudinal sectional view showing a lower side of a linear motion mechanism in the case in which a shaft is positioned at an upper limit of stroke in the horizontal articulated robot in FIG. 1.
Figure 3:
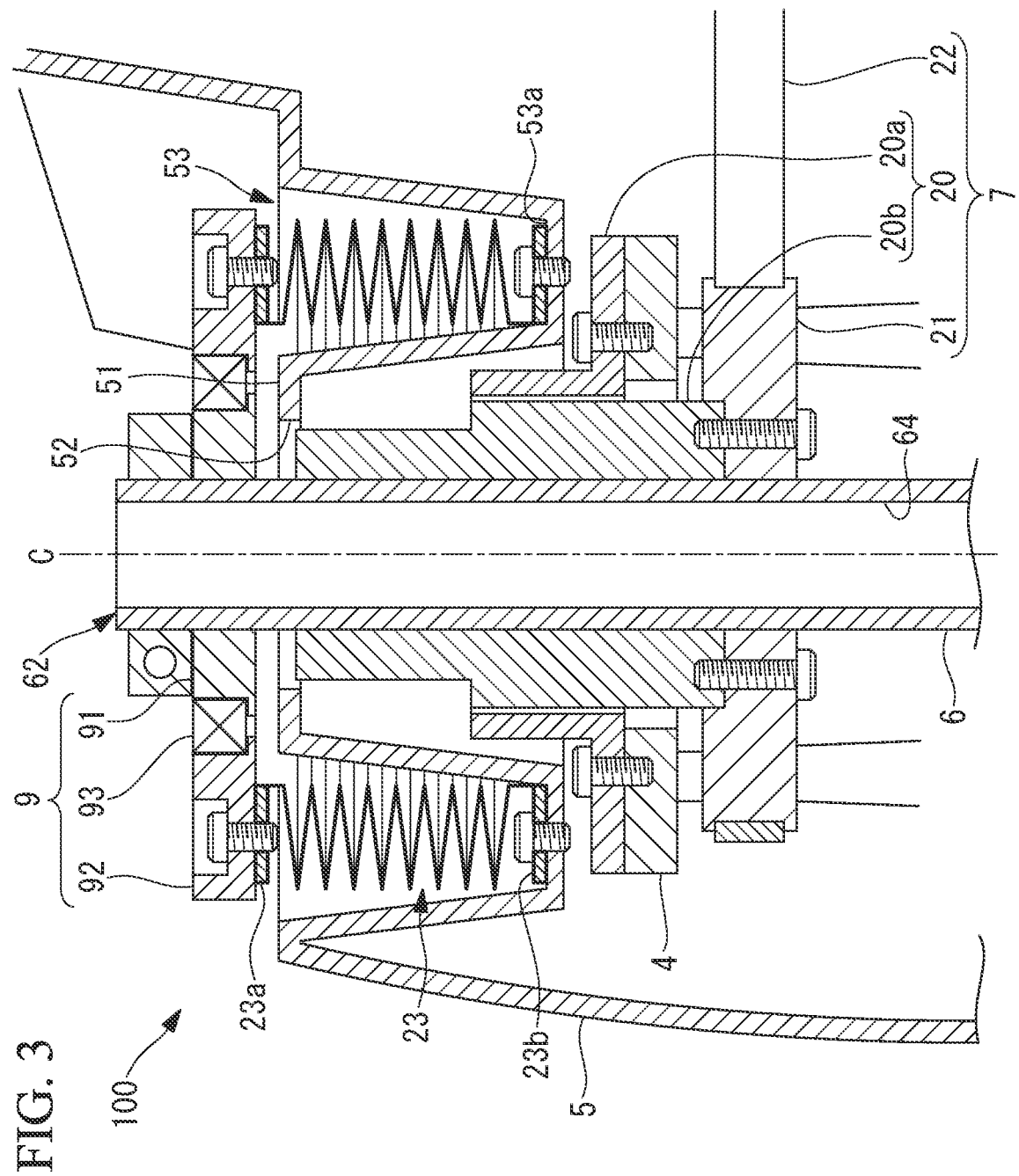
FIG. 3 is a partial longitudinal sectional view showing an upper side of the linear motion mechanism in the case in which the shaft is positioned at a lower limit of the stroke in the horizontal articulated robot in FIG. 1.

In addition, the horizontal articulated robot 1 according to this embodiment includes the linear motion mechanism 100 mounted on the second arm 4. As shown in FIGS. 1 to 3, the linear motion mechanism 100 includes: a shaft 6 that penetrates the second arm 4 and the arm cover 5 along a third axis (axis) C extending in the vertical direction; and a drive mechanism 7 for driving the shaft 6. In addition, the linear motion mechanism 100 includes axially extendable cylindrical bellows (protective covers) 13, 23 so as to surround a portion of the shaft 6, which protrudes to the outside from the second arm 4 and the arm cover 5.

The shaft 6 is, for example, a ball screw spline shaft.

As shown in FIG. 2, a lower end (end portion) 61 of the shaft 6 protrudes vertically downward from an opening portion (opening) 42 provided in a lower surface 41 of the second arm 4.

In addition, the lower end 61 of the shaft 6 is provided with an attachment portion 63 to which a tool (not shown) such as a hand is attached.

Meanwhile, as shown in FIG. 3, an upper end (end portion) 62 of the shaft 6 protrudes vertically upward from an opening portion (opening) 52 provided in an upper surface 51 of the arm cover 5.

The shaft 6 is provided with a central hole 64 extending along the longitudinal axis from the upper end 62 to the lower end 61. A wire body (not shown), such as a cable, connected to a controller (not shown) is inserted into the central hole 64 from the upper end 62 of the shaft 6, and is wired to the tool attached to the lower end 61 of the shaft 6.

The drive mechanism 7 includes a ball spline nut 10 and a ball screw nut 20 that are accommodated in the space S. In addition, the drive mechanism 7 includes: servo motors (not shown) that generate driving forces; and pulleys 11, 21 and belts 12, 22 that respectively transmit the driving forces of the respective servo motors to the ball spline nut 10 and the ball screw nut 20.

As shown in FIG. 2, the ball spline nut 10 includes: a fixed portion 10*a* that is fixed to the second arm 4; and a movable portion 10*b* that is supported by means of a bearing (not shown) so as to be rotatable about the longitudinal axis of the shaft 6 with respect to the fixed portion 10*a*.

The ball spline nut 10 makes the movable portion 10*b* engage with the shaft 6 with balls (not shown) interposed therebetween. By doing so, the ball spline nut 10 supports the shaft 6 so as to be movable along the longitudinal axis with respect to the movable portion 10*b*, and also rotates the shaft 6 about the longitudinal axis by means of rotation of the movable portion 10*b*.

As shown in FIG. 3, the ball screw nut 20 includes: a fixed portion 20*a* that is fixed to the second arm 4; and a movable portion 20*b* that is supported by means of a bearing (not shown) so as to be rotatable about the longitudinal axis of the shaft 6 with respect to the fixed portion 20*a*.

The ball screw nut 20 makes the movable portion 20*b* engage with the shaft 6 with balls (not shown) interposed therebetween, and by doing so, moves the shaft 6 in a longitudinal axis direction by means of rotation of the movable portion 20*b* with respect to the fixed portion 20*a*.

An upper end 13*a* of the bellows 13 is fixed to the lower surface 41 of the second arm 4, and a lower end 13*b* thereof is attached to the lower end 61 of the shaft 6 by means of an attachment mechanism 8.

The attachment mechanism 8 includes: an annular inner ring member 81 that is fixed to the lower end 61 of the shaft 6; an annular outer ring member 82 to which the lower end 13*b* of the bellows 13 is fixed; and a bearing 83 that supports the outer ring member 82 so as to be rotatable about the third axis C with respect to the inner ring member 81.

In addition, a lower end 23*b* of the bellows 23 is fixed to the upper surface 51 of the arm cover 5, and an upper end 23*a* thereof is attached to the upper end 62 of the shaft 6 by means of an attachment mechanism 9.

The attachment mechanism 9 includes: an annular inner ring member 91 that is fixed to an outer circumferential surface of the upper end 62 of the shaft 6; an annular outer ring member 92 to which the upper end 23*a* of the bellows 23 is fixed; and a bearing 93 that supports the outer ring member 92 so as to be rotatable about the third axis C with respect to the inner ring member 91.

With this configuration, when the shaft 6 moves in the direction of the third axis C, the bellows 13, 23 extend and contract in accordance with the vertical movement of the attachment mechanisms 8, 9 fixed to the shaft 6. The bellows 13, 23 have such dimensions that make it possible to maintain, over the entire stroke of the shaft 6, a state in which the opening portions 42, 52 and an outer surface of the shaft 6 protruding from the opening portions 42, 52 are covered. In addition, when the shaft 6 rotates about the third axis C, the inner ring members 81, 91 are rotated with respect to the outer ring members 82, 92, whereby twisting of the bellows 13, 23 is prevented.

In this case, the lower surface 41 of the second arm 4 is provided with a cylindrical recessed portion 43 that is recessed upward so as to surround the outer circumference of the ball spline nut 10 accommodated in the space S. A bottom surface 43*a* of the recessed portion 43 is provided with a seat surface for fixing the upper end 13*a* of the bellows 13. In addition, the opening portion 42 provided in the second arm 4 is disposed at a position substantially equivalent to a lower surface (end surface) of the movable portion 10*b* of the ball spline nut 10.

As shown in FIG. 2, the depth from the opening portion 42 to the bottom surface 43*a* of the recessed portion 43 is set to such a dimension that allows accommodation of the bellows 13 in the most compressed state at an upper limit of the stroke of the shaft 6. At this position, the attachment mechanism 8 comes closest to the lower surface 41 of the second arm 4 with a minute gap therebetween.

In addition, the upper surface 51 of the arm cover 5 is provided with a cylindrical recessed portion 53 that is recessed downward so as to surround the outer circumference of the ball screw nut 20 accommodated in the space S. A bottom surface 53*a* of the recessed portion 53 is provided with a seat surface for fixing the lower end 23*b* of the bellows 23. In addition, the opening portion 52 provided in the arm cover 5 is disposed at a position substantially equivalent to an upper surface (end surface) of the movable portion 20*b* of the ball screw nut 20.

As shown in FIG. 3, the depth from the opening portion 52 to the bottom surface 53*a* of the recessed portion 53 is set to such a dimension that allows accommodation of the bellows 23 in the most compressed state at a lower limit of the stroke of the shaft 6. At this position, the attachment mechanism 9 comes closest to the upper surface 51 of the arm cover 5 with a minute gap therebetween.

The operation of the thus-configured linear motion mechanism 100 and horizontal articulated robot 1 will be described below.

With the horizontal articulated robot 1 according to this embodiment, it is possible to two-dimensionally position the shaft 6 at a desired position in the horizontal direction by rotating the first arm 3 about the first axis A with respect to the base 2 and rotating the second arm 4 about the second axis B with respect to the first arm 3.

Then, by actuating the servo motor, it is possible to rotate the ball spline nut 10 about the third axis C, thereby rotating the shaft 6 about the third axis C with respect to the second arm 4. In addition, by actuating the servo motor, it is possible to rotate the ball screw nut 20 about the third axis C, thereby linearly moving the shaft 6 along the third axis C with respect to the second arm 4. By doing so, it is possible to rotate and vertically move the shaft 6 positioned at the desired horizontal position to adjust the vertical position of a tool attached to the attachment portion 63 at the lower end 61 of the shaft 6 and the angle of the tool about the third axis C.

For example, as shown in FIG. 2, in the case in which the shaft 6 is moved vertically upward with respect to the second arm 4, the amount by which the shaft 6 protrudes from the opening portion 42 decreases by the amount of movement of the shaft 6, and the amount by which the shaft 6 protrudes from the opening portion 52 increases by the amount of movement of the shaft 6. At this time, the bellows 13 is compressed in accordance with the decrease in the amount by which the shaft 6 protrudes from the opening portion 42, and the bellows 23 is extended in accordance with the increase in the amount by which the shaft 6 protrudes from the opening portion 52.

In contrast, as shown in FIG. 3, when the shaft 6 is moved vertically downward with respect to the second arm 4, the amount by which the shaft 6 protrudes from the opening portion 52 decreases by the amount of movement of the shaft 6, and the amount by which the shaft 6 protrudes from the opening portion 42 increases by the amount of movement of the shaft 6. In this case, the bellows 23 is compressed and the bellows 13 is extended.

In other words, even when the shaft 6 is vertically moved with respect to the second arm 4, the opening portions 42, 52 and the shaft 6 protruding from the opening portions 42, 52 are maintained in a state of being covered respectively by the bellows 13, 23. With this configuration, the shaft 6 and the space S are protected from moisture, dust, or the like from the outside.

In addition, as shown in FIGS. 2 and 3, the bellows 13, 23 have a prescribed length in the axial direction even in the most compressed state. With this embodiment, the seat surfaces for attachment of the bellows 13, 23 are arranged on the bottom surfaces 43a, 53a of the recessed portions 43, 53; thus, it is possible to accommodate the bellows 13, 23 in the most compressed state in the recessed portions 43, 53.

In other words, even when the bellows 13, 23 are attached to the shaft 6, it is possible to bring the end portion of the shaft 6 sufficiently close to the end surface of the ball spline nut 10 or the ball screw nut 20 at the stroke end. As a result, there is an advantage in that it is not necessary to extend both ends of the shaft 6 by means of relay shafts to attach the bellows 13, 23 to the shaft 6, and thus, it is possible to suppress an increase in the size of the horizontal articulated robot 1.

As in the related art, in the case in which both ends of the shaft 6 are extended by means of relay shafts to mount the bellows 13, 23, the position of the attachment portion 63 for a tool at the end portion of the shaft 6 changes due to the presence or absence of the bellows 13, 23; however, there is no such problem with this embodiment.

Figure 4:
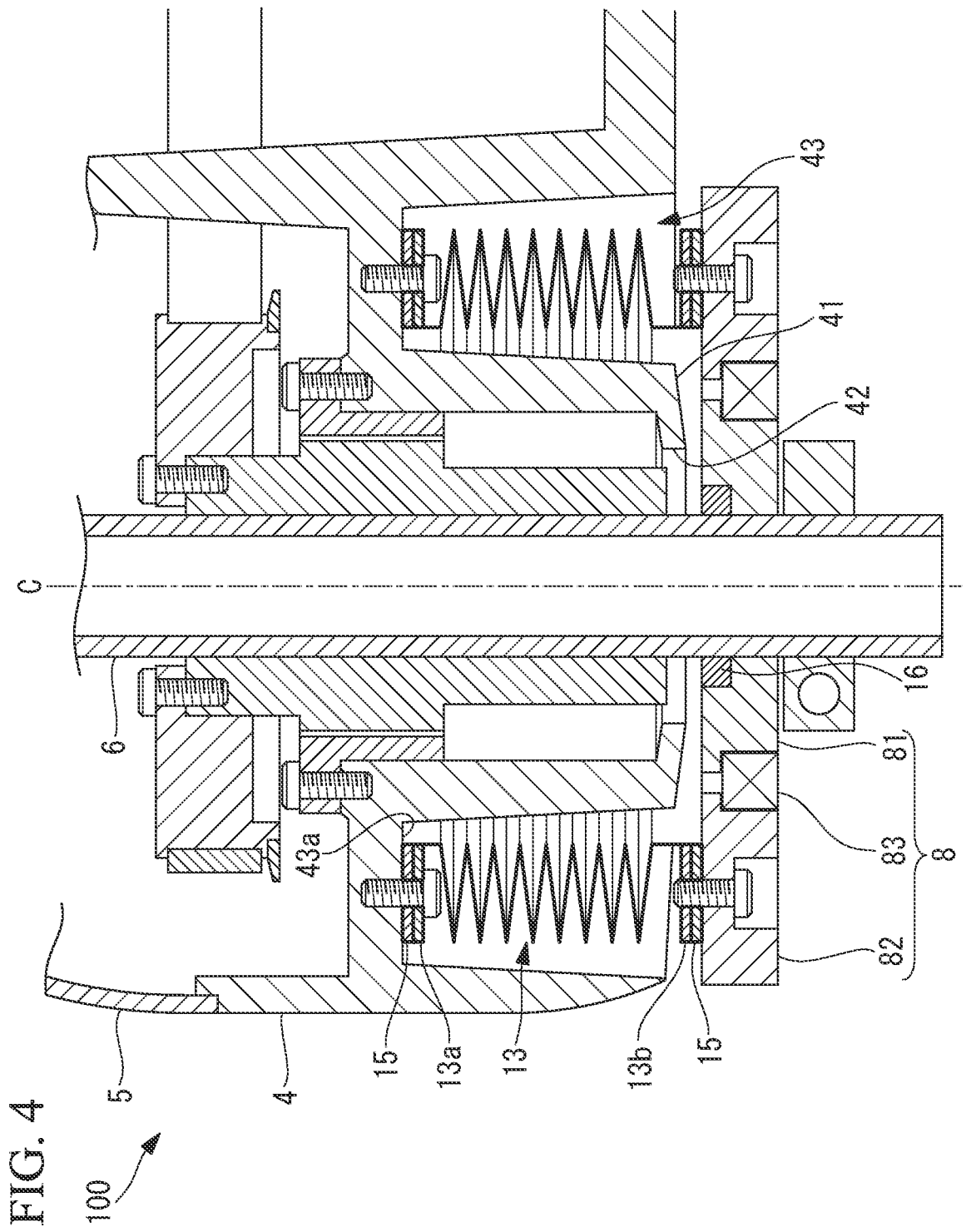
FIG. 4 is a partial longitudinal sectional view showing a modification of the linear motion mechanism in FIG. 2.

Note that, in this embodiment, as shown in FIG. 4, annular seal members 15, such as gaskets, may be employed to seal between the lower end 13b of the bellows 13 and the outer ring member 82, and between the upper end 13a of the bellows 13 and the bottom surface 43a of the recessed portion 43.

In addition, a seal member 16, such as an O-ring, may be employed to form a seal between the outer circumferential surface of the shaft 6 and the inner ring member 81, and a seal-equipped bearing may be employed as the bearing 83.

Similarly, as shown in FIG. 5, annular seal members 25, such as gaskets, may be employed to form seals between the upper end 23a of the bellows 23 and the outer ring member 92, and between the lower end 23b of the bellows 23 and the bottom surface 53a of the recessed portion 53.

In addition, a seal member 26, such as an O-ring, may be employed to form a seal between the outer circumferential surface of the shaft 6 and the inner ring member 91, and a seal-equipped bearing may be employed as the bearing 93.

With this configuration, it is possible to more reliably protect the shaft 6 and the space S from moisture, dust, or the like entering from the outside.

In addition, a labyrinth structure may be employed between the shaft 6 and the inner ring members 81, 91.

In addition, although the case in which the shaft 6 penetrates both the second arm 4 and the arm cover 5 in the vertical direction has been illustrated as an example in this embodiment, alternatively, the shaft 6 may penetrate only one of the second arm 4 and the arm cover 5 in the vertical direction.

In this case, it is not necessary to provide a bellows in the end portion of the shaft 6 that does not penetrate the second arm 4 or the arm cover 5, and thus, the linear motion mechanism 100 may have a simpler configuration.

In addition, although the horizontal articulated robot 1 in which the bellows 13, 23 are attached to the lower end 61 and the upper end 62 of the shaft 6 has been illustrated as an example in this embodiment, alternatively, only one of the ends may have a bellows mounted thereon.

In addition, although a vertical shaft mounted on the second arm 4 of the horizontal articulated robot 1 has been illustrated as an example of the linear motion mechanism 100 in this embodiment, alternatively, any other linear motion mechanism having a similar structure may be employed.

In addition, although a ball screw spline shaft is employed as the shaft 6 in this embodiment, alternatively, the shaft 6 may be composed of a ball spline shaft. In this case, it suffices to include, as the drive mechanism 7, a mechanism for rotationally driving the ball spline shaft about the longitudinal axis thereof, and a mechanism for linearly moving the ball spline shaft in the longitudinal axis direction thereof.

As the mechanism for linearly moving the ball spline shaft in a direction along the longitudinal axis, a publicly known linear motion mechanism, such as a cylinder, may be employed in addition to a ball screw.

In addition, in this embodiment, the shaft 6 may be composed of a ball screw shaft, and the ball screw nut 20 may be provided as the drive mechanism 7. In this case, because the ball screw shaft can be moved only in a direction along the longitudinal axis thereof, the function for rotating about the third axis C may be omitted in the attachment mechanisms 8, 9.

In addition, although the bellows has been illustrated as an example of the protective cover, the protective cover is not limited thereto, and it is permissible to employ a protective cover having an arbitrary structure that is extendable in the axial direction. For example, a telescopically extendable protective cover or a spirally extendable protective cover may be employed.

REFERENCE SIGNS LIST 1 horizontal articulated robot
4 second arm (housing, arm)
5 arm cover (housing)
6 shaft
7 drive mechanism
10 ball spline nut
13 bellows (protective cover)
20 ball screw nut
23 bellows (protective cover)
41 lower surface
42 opening portion (opening)
51 upper surface
52 opening portion (opening)
61 lower end (end portion)
62 upper end (end portion)
100 linear motion mechanism
C third axis (axis)
S space

The invention claimed is:

1. A linear motion mechanism comprising:
an elongated shaft that extends along a prescribed axis;

a drive mechanism that moves the shaft in the axis direction with a prescribed stroke;

a housing that accommodates the drive mechanism and that is provided with an opening through which at least one end portion of the shaft protrudes to the outside in a retractable manner; and a tubular protective cover with one end fixed to the housing and another end fixed to the end portion of the shaft, wherein the protective cover surrounds the opening and a portion of the shaft protruding outward from the opening, extends and contracts in the axis direction in accordance with movement of the shaft in the axis direction with respect to the housing, and is fixed to the housing at a position where a portion of the drive mechanism, including an end surface through which the shaft protrudes, is disposed radially inside the protective cover, and the one end is fixed to the housing at a position where a distance in the axis direction between the other end and the end surface of the drive mechanism is smaller than a distance in the axis direction between the one end and the end surface of the drive mechanism when the protective cover is fully compressed.

2. The linear motion mechanism according to claim 1, wherein:

the shaft is a spline shaft;

the drive mechanism comprises a ball spline nut that rotates the shaft about the axis by means of rotation about the axis; and the protective cover is fixed to the housing at a position where at least a portion of the ball spline nut is disposed inside the protective cover.

3. The linear motion mechanism according to claim 1, wherein:

the shaft is a ball screw spline shaft;

the drive mechanism comprises a ball screw nut that moves the shaft in a direction along the axis by means of rotation about the axis; and the protective cover is fixed to the housing at a position where at least a portion of the ball screw nut is disposed inside the protective cover.

4. The horizontal articulated robot comprising:

a linear motion mechanism according to claim 1; and a horizontal arm that is supported so as to be horizontally rotatable, wherein the arm has the drive mechanism mounted thereon and supports the shaft so as to be movable in a vertical direction, the housing comprises the arm and an arm cover that accommodates the drive mechanism in a space between the arm and the arm cover, and the protective cover is arranged so as to surround at least one of an end portion of the shaft protruding vertically downward from the opening in a lower surface of the arm, and an end portion of the shaft protruding vertically upward from the opening in an upper surface of the arm cover.

5. The linear motion mechanism according to claim 1, wherein the one end of the protective cover is fixed to a bottom surface of a recessed portion provided so as to surround an outer circumference of the opening.

* * * * *